United States Patent Office 3,412,059
Patented Nov. 19, 1968

3,412,059
AQUEOUS DISPERSION COATING CONTAINING WAX AND CERTAIN ACRYLATE TYPE POLYMERS
Jerome H. Stickelmeyer and John C. Safranski, Jr., Midland, Mich., assignors to The Dow Chemical Company, Midland, Mich., a corporation of Delaware
No Drawing. Filed Dec. 12, 1963, Ser. No. 329,983
4 Claims. (Cl. 260—28.5)

ABSTRACT OF THE DISCLOSURE

Aqueous dispersions containing wax and a water soluble copolymer solution wherein the copolymer contains methyl methacrylate, a polymerizable carboxylic acid, and an acrylate type monomer are employed to form a scratch resistant, clear, relatively block free coating having excellent slip characteristics on polystyrene-type shaped articles.

---

This invention relates to a coated, oriented alkenyl aromatic resinous shaped article and a composition for the preparation thereof. It more particularly relates to an alkenyl aromatic resinous shaped article such as a film or sheet having a coating of a copolymer comprising an acrylic type acid and an acrylic type ester having incorporated therein a minor proportion of a wax.

The invention is particularly adapted to be practiced with integral solid styrene polymer film or sheets. Such a polymer, which may have an essentially linear molecular configuration or be in a cross-linked form is employed herein as being generally representative of alkenyl aromatic compounds of the type that contain at least about 50 weight percent of at least one polymerized alkenyl aromatic compound or monomer having the general formula: Ar—CR=CH$_2$, wherein R is hydrogen or methyl and Ar is an aromatic radical, advantageously of the benzene series, of from 6 to 10 carbon atoms (including the carbon atoms in any ring substituents on the aromatic nucleus). Thermoplastic polymers and copolymers of styrene and polymers and copolymers of α-methyl styrene, ar-methyl styrene (or vinyl toluene), the several mono- and dichlorostyrenes and ar-dimethyl styrenes, including copolymers thereof with such materials as vinylidene chloride and acrylonitrile; and graft copolymers with other polymeric substances (such as other elastomeric polymers) may frequently be utilized with benefits commensurate with or in excess of those which are derivable from employment of polystyrene alone.

Flexible film may be prepared from the above-described thermoplastic materials by thermofabrication, specifically extrusion. Process, techniques and apparatus for such fabrication are known. Other techniques include solvent casting the polymeric composition from a volatile solvent followed by evaporation of the solvent. Flexible film from these alkenyl aromatic resins may be prepared at a wide variety of gauges, colors, and widths. As commercially available, such films are sold in thicknesses of from 0.0003 to about 0.015 inch. Since the modifications contemplated by this invention involve primary surface phenomena, they are adaptable to any size, shape or thickness where uniform coating may be applied. The modifications are also useful with other moldings, extrusions or any other thick section of a rigid or semi-rigid nature. Alkenyl aromatic resinous shaped articles including sheet and film are particularly susceptible to marring of the surface by contact with other articles. Typical of these is polystyrene which is relatively easily scarred by passing an article across the surface in contact therewith. Such a characteristic is relatively undesirable in many fabricated products as the clarity is usually reduced with use, particularly those articles employed in the fields of packaging and decoration as well as many utilitarian applications wherein the properties of transparency and clarity of surface are of great importance. Such material has not been suitable for many applications because of the tendency to scratch and scar or it has been employed in applications where only relatively mild abrasion or scratching conditions are expected to exist and the useful life of the article is relatively short.

It is an object of this invention to provide an improved alkenyl aromatic resinous film.

It is an object of this invention to provide a non-tacky, non-blocking alkenyl aromatic resinous film having good slip characteristics and high scratch resistance.

It is a further object of this invention to provide a method of coating an alkenyl aromatic resinous film ultilizing an aqueous vehicle to provide a coating having excellent anti-scratch property.

The composition of the present invention comprises a fluid aqueous dispersion of (1) a soluble copolymer, the copolymer comprising in chemically combined form (a) from 5–20 percent by weight based on the total weight of the copolymer of an organic copolymerizable acid selected from the group consisting of acrylic acid, methacrylic acid, itaconic acid, fumaric acid and maleic acid; (b) from 30–95 percent based on the total weight of the copolymer of methyl methacrylate and (c) an acrylic ester of the formula:

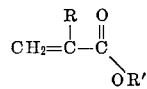

wherein R is selected from the group consisting of hydrogen and methyl and R' is selected from the group consisting of methyl, ethyl, propyl, isopropyl, isobutyl, n-butyl and secondary butyl with the further limitation that when R' is ethyl, isopropyl, or isobutyl, it may be present from 0–65 weight percent of the copolymer and that when R' is n-butyl and R is hydrogen it shall be present in a proportion not greater than 30 percent by weight of the total composition, the copolymer being soluble in water to the extent of 1 percent by weight when sufficient ammonia is present in the solution to result in a pH of greater than 7; (2) a hard wax comprising 5–20 percent by weight of the combined weight of the wax and the copolymer, the wax being dispersed in the aqueous dispersion and having a particle size less than about 1 micron.

In accordance with the method of the present invention an alkenyl aromatic resinous shaped article is coated with an aqueous dispersion as hereinbefore delineated, the water removed by evaporation to provide a coating having a thickness of from about 0.1 micron to about 5 microns and advantageously from about 0.5 micron to about 2 microns. The soluble acrylic copolymers of the present invention are readily prepared by mass polymerization, emulsion polymerization, or solution polymerization. Techniques for preparing these polymers are well known in the art. The critical requirement is that the resultant copolymers be soluble in water to an extent of 1 percent by weight of the total solution when sufficient ammonia is present to maintain the pH of the dispersion between about 7 and 10.

Many waxes may be utilized in the practice of the present invention and include waxes which may be emulsified or dispersed into an aqueous carrier and have a particle size of about 1 micron or less, and, preferably, less than about 0.2 micron where a transparent coating is desired. By "particle size" is meant the size of the ultimate particle as would be determined by the use of an electron microscope. The term "hard wax" includes those waxes having a hardness greater than that of natural beeswax. Generally waxes, when evaluated for hardness by means of the penetration test in accordance with the American Society for Testing Materials Standard D 1168–51 T having a penetration value of 10 and less constitute hard waxes in accordance with the term as employed herein. Such hard waxes include bayberry wax, refined ordinary beeswax, candililla wax, carnauba wax, domestic hard cerasin melting at 185° Fahrenheit, Douglas fir-bark wax, esparto wax, flax wax, orange peel wax, ouricury wax, American paraffin wax 152/154, Asiatic paraffin wax 148/150, and sugar cane wax. Among other waxes which are suitable are those that are sold under the trade name of Cardis One, Cardis 320, and castor wax.

The hard wax component beneficially is incorporated by first preparing an aqueous emulsion or dispersion of the wax. This generally is accomplished by employing, in the case of hydrophobic waxes, a wetting agent. The wetting agent usually comprises from about 5 to about 25 percent of the weight of the wax to be emulsified. The wetting agent and the wax are heated to a temperature sufficiently high to melt the wax and subject the system to violent agitation such as is obtained in colloid mills and the like during water addition. Subsequently, the dispersion is cooled, permitting the wax to solidify as a plurality of finely dispersed metastable particles. The coating formulation may then be prepared by admixing suitable quantities of the polymer solution and the wax dispersion with a suitable quantity of water. The total solids concentration of the coating solution will usually vary from between about one-half percent by weight to about 25 percent by weight depending on the thickness of the coating desired and the method employed to apply the coating. Since only small proportions of the composition are required to produce a continuous scratch resistant layer or coating of the composition on the surface of the shaped article to be treated, the particular concentration chosen will vary with the coating technique to be used and the desired thickness of the coating. Oftentimes optionally the dispersion may be post stabilized after formation by the use of various surface active agents such as the sodium salt of alkyl dodecyl benzene sulfonates, alkyl derivatives of sodium salts of sulfosuccinic acids, and similar well known commercially available surface active agents, colloids and the like. Such stabilization is usually necessary only when the dispersions are required to have a significant shelf life or are to be subjected to mechanical working prior to application to the shaped article. Such dispersion or solution of the ingredients of the anti-scratch composition is applied to the surfaces of the sheet or film by brushing, dipping, spraying, roller coating or by doctor blade. The aqueous coatings beneficially are dried by evaporation at a temperature below the heat distortion point of the alkenyl aromatic substrate. Desirably in such drying the temperature of the coating should not rise above the boiling point of water as some unevenness in the deposition may be observed. Beneficially in most instances the drying is desirably carried out in a current of warm air at a temperature of from about 20° centigrade to about 80° centigrade, the particular temperature being selected depending upon the drying facilities available and rate of drying desired.

By way of further illustration, a plurality of acrylic copolymers are prepared by polymerization in a resin pot equipped with a blade type agitator, thermometer well, and a reflux condenser, a dropping funnel and a nitrogen sparger. The pot is charged with propanol (26.8 percent by weight of the total reaction mixture based on the weight of the monomeric components and the n-propanol), together with 1 percent by weight (based on the total weight of the monomers) of benzoyl peroxide. The total monomer charge together with 13.2 weight percent n-propanol (based on the combined weight of the monomers and propanol) are placed in the dropping funnel with 1 percent by weight of benzoyl peroxide (based on the monomers). The pot and dropping funnel are purged with nitrogen for 30 minutes to remove traces of oxygen. The pot and the pot charge are heated to 97° centigrade and the addition charge, that is, the monomers with propanol and benzoyl peroxide are added to the pot from the dropping funnel over a period of 4 hours while maintaining a temperature in the pot of 97° centigrade. Heating at this temperature is continued for an additional two hours. During the polymerization period the blade type agitator provides vigorous agitation throughout the contents of the resin pot. Analysis of the product indicates that all of the monomers are converted into polymer. After polymerization the reaction mixture is treated with 28 percent by weight aqueous ammonium hydroxide in a proportion of 1.5 moles of ammonia per mole of carboxyl group. The reaction mixture at this stage is diluted with water to a desired solids concentration. Wax dispersions are prepared by melting the wax with 20 percent by weight (based on the weight of the wax) of sodium oleate. The melted wax-sodium oleate mixture is violently agitated with water added slowly to form a dispersion of wax in water having a particle size of about 0.2 of a micron. The wax dispersion is admixed with the aqueous polymeric dispersion at a pH of >7, which is stabilized with 1 percent by weight of tetrasodium N-(1,2-dicarboxyethyl) N-octadecylsuccinamate. The quantity of water was adjusted to maintain a total solids concentration of 15 percent by weight. The coating composition is metered onto the surface of a 5 mil thick biaxially oriented polystyrene film in a thickness sufficient to deposit a dry coating of about 1.5 microns in thickness. The wet coating is dried by passing the coated film through an air oven at a temperature of about 80° centigrade. The dried coated film is then evaluated for scratch resistance by means of a Princeton Adhesion and Scratch Tester Model SG1620, manufactured by Gardener Laboratory Incorporated and utilizing a Model SG1620B stylus and employing various pressures thereon. The results of these experiments are set forth in the following table.

TABLE

| Ex. No. | Polymer Composition | Wax | Scratch Resistance |
|---|---|---|---|
| 1 | No Coating | | P |
| 2 | MMA 95%; AA 5% | 10% Carnauba | E |
| 3 | MMA 50%; MA 45%; AA 5% | do | E |
| 4 | MMA 40%; MA 45%; AA 5% | 5% Carnauba | E |
| 5 | MMA 60%; MA 35%; MAA 5% | 7½% Carnauba | E |
| 6 | MMA 90%; IA 10% | do | E |
| 7 | MMA 80%; FA 20% | 15% Carnauba | VG |
| 8 | MMA 30%; MA 65%; AA 5% | 13% Carnauba | VG |
| 9 | MMA 40%; EA 40%; MA 10%; MAA 10% | 7% Carnauba | E |
| 10 | MMA 70%; EA 22.5%; MAA 7.5% | 40% Carnauba | G |
| 11 | MMA 50%; EA 42.5%; MAA 7.5% | do | G |
| 12 | MMA 40%; EA 62.5%; MAA 7.5% | do | G |
| 13 | MMA 42.5%; EA 42.5%; MAA 15% | do | G |
| 14 | MMA 50%; EA 35%; MAA 15% | do | G |
| 15 | MMA 60%; EA 25%; MAA 15% | do | G |
| 16 | MMA 70%; EA 20%; MAA 10% | 15% Carnauba | VG |
| 17 | MMA 70%; EA 22.5%; MAA 7.5% | do | VG |
| 18 | MMA 50%; EA 42.5%; MAA 7.5% | do | VG |

TABLE—Continued

| Ex. No. | Polymer Composition | Wax | Scratch Resistance |
|---|---|---|---|
| 19 | MMA 50%; EA 35%; MAA 15% | do | VG |
| 20 | MMA 30%; EA 62.5%; MAA 7.5% | do | VG |
| 21 | MMA 42.5%; EA 42.5%; MAA 15% | do | VG |
| 22 | MMA 70%; EA 22.5%; MAA 7.5% | | F |
| 23 | MMA 70%; EA 22.5%; MAA 7.5% | 1% Carnauba | G |
| 24 | MMA 70%; EA 22.5%; MAA 7.5% | 3% Carnauba | VG |
| 25 | MMA 70%; EA 22.5%; MAA 7.5% | 5% Carnauba | E |
| 26 | MMA 70%; EA 22.5%; MAA 7.5% | 10% Carnauba | E |
| 27 | MMA 70%; EA 22.5%; MAA 7.5% | 20% Carnauba | VG |
| 28 | MMA 30%; EA 62.5%; MAA 7.5% | 1% Carnauba | G |
| 29 | MMA 30%; EA 62.5%; MAA 7.5% | 3% Carnauba | VG |
| 30 | MMA 30%; EA 62.5%; MAA 7.5% | 5% Carnauba | E |
| 31 | MMA 30%; IPA 65%; IA 5% | 7% Carnauba | E |
| 32 | MMA 50%; IPA 40%; MAA 10% | 8% Carnauba | E |
| 33 | MMA 30%; IBA 65%; AA 5% | 10% Carnauba | E |
| 34 | MMA 65%; IBA 20%; AA 15% | 7% Carnauba | E |
| 35 | MMA 50%; IBA 40%; MAA 10% | do | E |
| 36 | MMA 65%; n-BA 30%; AA 5% | 10% Carnauba | E |
| 37 | MMA 80%; n-BA 10%; AA 10% | do | E |
| 38 | MMA 60%; PA 30%; MAA 10% | 8% Carnauba | E |
| 39 | MMA 60%; SBA 30%; MAA 10% | 10% Carnauba | E |
| 40 | MMA 93%; MEA 7% | 7% Carnauba | E |

The symbols used in the foregoing table have the following meanings: AA=acrylic acid; EA=ethyl acrylate; FA=fumaric acid; IA=itaconic acid; IBA=isobutylacrylate; IPA=isopropyl acrylate; MA=methyl acrylate; MAA=methacrylic acid; MEA=maleic acid; MMA=methyl methacrylate; n-BA=n-butyl acrylate; PA=propyl acrylate; SBA=secondary butyl acrylate. Scratch resistance is indicated by the following abbreviations: E=excellent; VG=very good; G=good; F=fair and P=poor.

The foregoing illustrations are repeated with the exception that substrates utilized were oriented alkenyl aromatic films prepared from copolymers of 93 percent styrene and 7 percent acrylonitrile, 70 percent styrene and 30 percent acrylonitrile, 95 percent styrene and 5 percent methyl acrylate, 95 percent vinyl toluene and 5 percent acrylonitrile, 80 percent t.butyl styrene and 20 percent styrene, and commensurate scratch resistant coated films are obtained.

Similar beneficial and commensurate results are obtained when the foregoing experiments are repeated utilizing various hard waxes including bayberry wax, orange peel wax, ouricury wax, sugar cane wax, flax wax, and like waxes having a penetration value less than 10 when measured in accordance with the American Society for Testing Materials Standard D 1168-51 T employing a No. 14 needle.

The coated articles of the present invention have excellent clarity, substantially no tendency to block, and excellent slip characteristics.

As is apparent from the foregoing specification, the article and composition of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:
1. A composition adapted to provide an alkenyl aromatic resinous shaped article with scratch resistant clear surface comprising
  a fluid aqueous dispersion having a pH from about 7 to about 10 and consisting essentially of
  (1) a water soluble copolymer solution, the copolymer comprising in chemically combined form
    (a) from 5-20 percent by weight based on the total weight of the copolymer of an organic copolymerizable acid selected from the group consisting of acrylic acid, methacrylic acid, itaconic acid, fumaric acid and maleic acid;
    (b) from 30-95 percent based on the total weight of the copolymer of methyl methacrylate and
    (c) an acrylic ester of the formula:

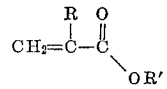

wherein R is selected from the group consisting of hydrogen and methyl and R' is selected from the group consisting of methyl, ethyl, propyl, isopropyl, isobutyl, n-butyl, secondary butyl with the further limitation that when R' is ethyl, isopropyl or isobutyl, it may be present from 0-65 weight percent of the copolymer and that when R' is n-butyl and R is hydrogen it shall be present in a proportion not greater than 30 percent by weight of the total composition, the copolymer being soluble in water to the extent of 1 percent by weight when sufficient ammonia is present in the solution to result in a pH of greater than 7;
  (2) a hard wax comprising 5-20 percent by weight of the combined weight of the wax and the copolymer, the wax being dispersed in the aqueous dispersion and having a particle size less than about 1 micron.

2. The composition of claim 1 wherein the copolymer contains about 70 parts by weight of methyl methacrylate, about 22.5 parts by weight of ethyl acrylate, and about 7.5 parts by weight methacrylic acid.

3. The composition of claim 1 wherein the wax comprises from about 5-10 percent by weight based on the total weight of the wax and copolymer.

4. The composition of claim 1 wherein the copolymerizable acid is methacrylic acid.

References Cited

UNITED STATES PATENTS

| | | | |
|---|---|---|---|
| 2,649,428 | 8/1953 | Moore et al. | 260—33.6 |
| 2,695,277 | 11/1954 | Pabst et al. | 260—28.5 |
| 2,875,056 | 2/1959 | Smith et al. | 117—138.8 |
| 2,971,934 | 2/1961 | Brown et al. | 260—28.5 |
| 3,177,087 | 4/1965 | Park et al. | 117—138.8 |
| 3,234,158 | 2/1966 | Pfluger et al. | 260—28.5 |

MORRIS LIEBMAN, *Primary Examiner.*

B. A. AMERNICK, *Assistant Examiner.*